United States Patent [19]

Bauer

[11] 4,368,579

[45] Jan. 18, 1983

[54] LOCKING CAP FOR AN OIL GAUGE PIPE

[75] Inventor: Ludwig Bauer, Stuttgart, Fed. Rep. of Germany

[73] Assignee: Daimler-Benz Aktiengesellschaft, Stuttgart, Fed. Rep. of Germany

[21] Appl. No.: 249,468

[22] Filed: Mar. 31, 1981

[30] Foreign Application Priority Data

Mar. 31, 1980 [DE] Fed. Rep. of Germany ....... 3012459

[51] Int. Cl.³ ............................................. G01F 23/04
[52] U.S. Cl. .................................. 33/176.7 R; 220/318
[58] Field of Search ................... 33/126.7 R, 126.7 A; 220/247, 250, 251, 314, 318

[56] References Cited

U.S. PATENT DOCUMENTS 2,663,084  12/1953  Coderre ........................ 33/126.7 R

FOREIGN PATENT DOCUMENTS 975310  9/1975  Canada ............................... 220/318
281387  of 1952  Switzerland ....................... 220/314

*Primary Examiner*—Charles E. Phillips
*Attorney, Agent, or Firm*—Paul M. Craig, Jr.

[57] ABSTRACT

A locking cap for an oil gauge pipe which includes a gauge rod mounted thereon, with the gauge rod being adapted to be inserted into the oil gauge pipe. An eccentric level arrangement is provided for locking the locking cap at the oil gauge pipe while a sealing ring is pressed between the locking cap and a flange of the oil gauge pipe. The eccentric lever is mounted on the locking cap and, in a locking position, reaches under the flange of the oil gauge pipe. In a locked position, the locking cap rests against the flange with the sealing ring being interposed between an inner surface of the locking cap and the flange.

22 Claims, 3 Drawing Figures

LOCKING CAP FOR AN OIL GAUGE PIPE

The present invention relates to a cap construction and, more particularly, to a locking cap adapted to be mounted on a filler or oil gauge pipe, with the locking cap having a gauge or measuring rod mounted thereon and an eccentric lever means for bracing or urging the locking cap against a sealing ring so as to sealingly close an inlet of the gauge pipe.

In order to facilitate a measuring of oil in a reservoir of, for example, an automatic transmission of a motor vehicle, it must be possible to check the oil levels through an oil gauge or filler pipe disposed in an engine area. Since the gauge or filler pipe extends into the oil in the oil reservoir, when the oil level is measured, the oil level in the gauge pipe must be in contact with the atmosphere to avoid a false measurement due to, for example, enclosed air cushions. Moreover, a locking cap for an oil gauge or filler pipe must also be pressure resistant and leakproof since, for example, with an automatic transmission, an excess pressure of about 3 bar may be built up due to a frothing or churning of the oil in the transmission reservoir by the elements of the transmission.

It has been proposed to provide a so-called "bottle stopper" arrangement for enabling a checking of oil level through an oil gauge pipe. More particularly, a piece of a rubber tube connected with a stopper and extending into the oil gauge pipe may be axially braced in such a way that any occurring deformation of the piece of rubber tube engages in a circumferential groove provided for this purpose in the oil gauge pipe so as to enable a fixing of the stopper in a form locking manner. A disadvantage of this proposed solution resides in the fact that considerably many parts must be coordinated with each other and the mass of the stopper at the end of the oil gauge pipe tends to carry out uncontrollable vibrations.

The aim underlying the present invention essentially resides in providing a locking cap of the aforementioned type for an oil gauge or filler pipe in which the mass of the locking cap is considerable reduced.

In accordance with advantageous features of the present invention, an eccentric lever is mounted at the locking cap at a position below the locking cap, with the eccentric lever, in a locking position, reaching or extending under a flange provided at the oil gauge pipe. The locking cap rests against the flange with a seating ring being interposed between the locking cap and the flange.

By virtue of the above-noted features of the present invention, a locking means is provided which only includes a locking cap, a sealing ring, and an eccentric lever that can lock the locking cap in position at the oil gauge pipe. The actual gauge round for enabling a measuring of the level of oil in the oil reservoir is inserted into the locking cap and locked in position.

Advantageously, in accordance with the present invention, the locking cap and the eccentric lever being manufactured by an injection molding or die-casting product and, with the use of a corresponding material and by means of profiling the two parts may be manufactured so that they are light in weight and inexpensive.

By virtue of the disposition of the locking mechanism below a flange that is located at the end of the oil gauge pipe and projects radially to the outside, the locking cap closes the oil gauge pipe so that it is oil tight and resistant to pressure.

Advantageously, in accordance with further features of the present invention, the eccentric lever may be formed of two lever parts that extend parallel to each other and reach around the oil gauge part, with the lever parts being connected to each other at an operating end by means of a connecting member forming a handle means for facilitating a displacement of the eccentric lever.

The handle means may be fashioned or constructed in such a manner that, in a locking position of the eccentric lever, the handle reaches or extends around the oil gauge part. Holding pins may be provided at the eccentric lever for fixing the eccentric lever so that the locking cap fits with the oil gauge pipe in an attractive manner without any projecting or bulky parts.

In order to render it possible to lock the handle in a closing position, in accordance with the present invention, ears or projections may be provided at the lever parts near the handle means for operating the eccentric lever.

Additionally, results are possible in accordance with the present invention, to shape stopping projections or ears at free ends of the lever parts of the eccentric lever.

The locking cap may be formed of a rectangular configuration and, more particularly, a square, with two wall parts that are disposed opposite to each other reaching or surrounding the oil gauge pipe and forming mounting walls for mounting of the lever parts of the eccentric lever. Stopping pins may be provided af the wall sections for mounting the eccentric lever in an open position, with the stopping pins cooperating with the stopping projections or ears. Consequently, the eccentric lever of the present invention may be locked in the opened position and a center of mass of the locking cap, by means of the mounting of the eccentric lever in accordance with the present invention, is transferred downward in a direction of the mounting of the oil gauge pipe.

The wall sections for enabling a mounting of the eccentric lever may be connected with each other by means of third and fourth wall sections with the fourth wall section forming a stop defining an open position of the eccentric lever.

Preferably, all the parts forming the locking means of the present invention are made of a plastic or synthetic resinous material.

Preferably, the locking cap of the present invention is provided with a central projection which accommodates the gauge rod with the gauge rod being mounted so that it may be rotatable relative to the locking cap. By virtue of these features, when the gauge rod is inserted into the oil gauge pipe, it can more easily adapt itself to a given bend of the oil gauge pipe.

The wall sections of the locking cap for enabling a mounting of the eccentric lever are provided with bearing lugs or eyes for accommodating projections of the like provided on the lever parts of the eccentric lever. Additionally, a transverse slot is provided through the projection for enabling an accommodation of the mounting means for the gauge rod. By virtue of these features of the present invention, it is possible to arrange a driving or spring coupling key in the extrusion die for the transverse slot so that the overall manufacture and construction can be simplified considerably.

Accordingly, it is an object of the present invention to provide a locking cap for an oil gauge pipe which avoids, by simple means, shortcomings and disadvantages encountered in the prior art.

Another object of the present invention resides in providing a locking cap for an oil gauge pipe which ensures the existence of a leak proof and pressure resistant seal at an inlet opening of the oil gauge pipe.

Yet another object of the present invention resides in providing a locking cap for an oil gauge pipe which is simple in construction and therefore relatively inexpensive to manufacture.

A further object of the present invention resides in providing a locking cap for an oil gauge pipe which may be mounted on and removed from an inlet opening of the oil gauge pipe in an extremely simple manner.

These and other objects, features, and advantages of the present invention will become more apparent from the following description when taken in connection with the accompanying drawing which shows, for the purposes of illustration only, one embodiment in accordance with the present invention, and wherein.

Figure 1:
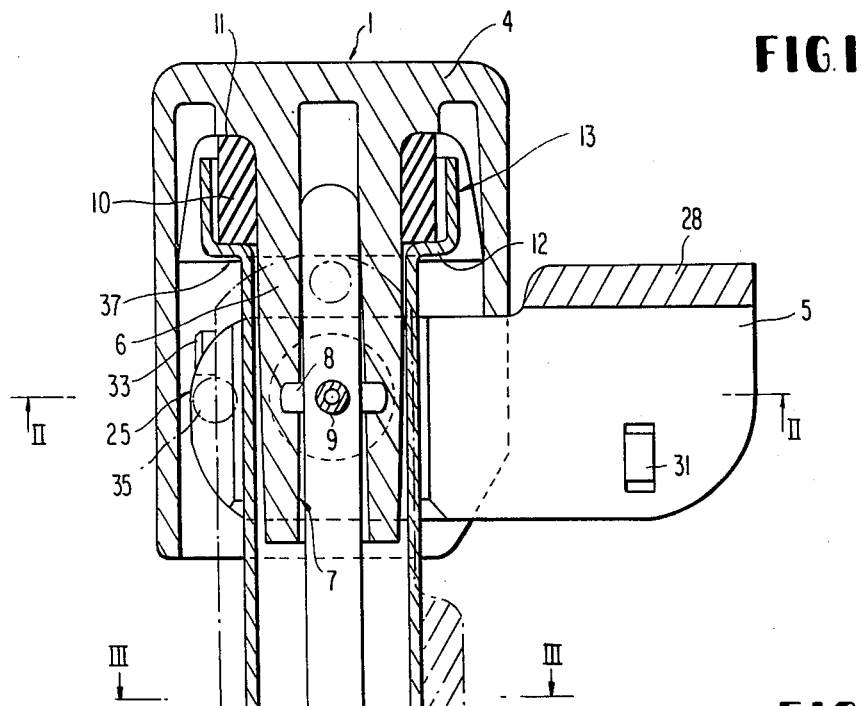
FIG. 1 is a longitudinal cross sectional view of an oil gauge or filler pipe having mounted thereon a locking cap constructed in accordance with the present invention, with an eccentric lever thereof in an open position.

Referring now to the drawings wherein like reference numerals are used throughout the various views to designate like parts and, more particularly, to FIG. 1, according to this figure, a locking cap arrangement generally designated by the reference numeral 1 includes a locking cap 4 having a centrally arranged coaxial projection 6 through which extends a longitudinal bore or hole generally designated by the reference numeral 7. The longitudinal bore or hole 7 is adapted to accommodate a portion of a guage or measuring rod 3. The gauge or measuring rod 3 extends into a gauge or filler pipe 2 so as to enable a measuring of a level of oil in an oil reservoir of, for example, an automatic transmission for a motor vehicle. An eccentric lever 5, to be described more fully hereinbelow, is pivotally mounted on the locking cap 4.

A transverse slot 8 is provided in the longitudinal bore or hole 7, with the gauge rod 3 being fixed in an area of the transverse slot by a fastening or tightening pin 9 so as to enable the gauge rod 3 to rotate relative to the locking cap 4, whereby the gauge rod 3 may more readily be adaptable to bends in the oil gauge pipe 2.

A sealing ring 10, providing a seal between the locking cap 4 and gauge pipe 2, is mounted on the coaxial projection 6 in such a manner that one end of the ring 10 rests against a ring-shaped or annular projection 11 of the locking cap 4, with the other end of the ring 10 being supported at a flange 12 provided at an opening or inlet end generally designated by the reference numeral 13 of the gauge pipe 2.

Figure 2:
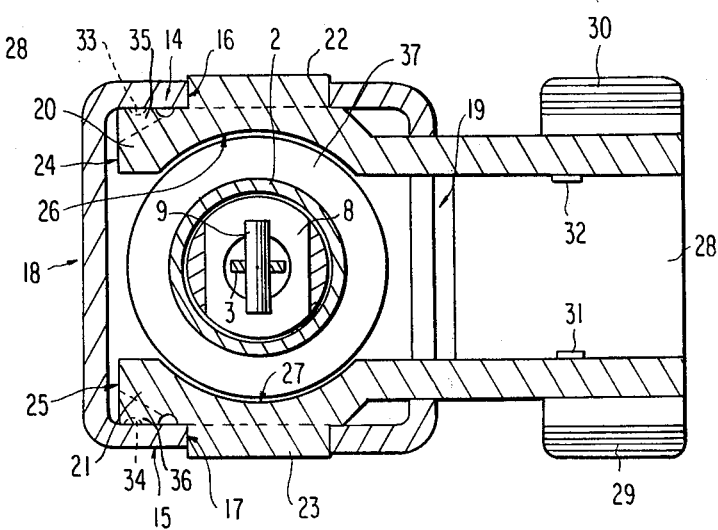
FIG. 2 is a cross sectional view taken along the line II—II in FIG. 1.

As shown most clearly in FIG. 2, the locking cap 4 has a generally rectangular outer configuration and includes two oppositely disposed wall sections 14, 15 which reach or extend around the oil gauge pipe 2. The eccentric lever 5 is mounted in bearing lugs or eyes 16, 17 provided in the respective wall sections 14, 15. Additional oppositely disposed wall sections 18, 19 serve as connecting walls connecting the wall sections 14, 15 to each other. The wall section 19 also functions to serve as a stop means for defining an opening position of the eccentric lever 5.

The eccentric lever 5 has a generally U-shaped configuration and includes two spaced lever arms or forks 20, 21 joined by a connecting part 28. Supporting pins 22, 23 are disposed on the respective arms or forks 20, 21 and are adapted to be inserted into the bearing openings or eyes 16, 17. The insertion of the supporting pins 22, 23 into the bearing lugs or eyes 16, 17 is accomplished in a relatively simple manner by virtue of the elasticity of the material of the eccentric lever 5 and wall sections 14, 15, 18, 19, of the locking cap 4.

The lever parts 20, 21 of the eccentric lever 5 are fashioned as eccentrics generally designated by the reference numeral 24, 25. When the eccentric lever 5 is in an open position, cylindrical recesses generally designated by the reference numerals 26 and 27 formed on the lever parts 20, 21 surround an outer contour of the oil gauge pipe 2. For this purpose, the cylindrical recesses are coaxial with the outer contour or curved surface of the oil gauge pipe 2. The recesses 26, 27 of the lever parts 20, 21 are adapted to be pushed over the inlet or opening end 13 of the oil gauge pipe 2.

Figure 3:
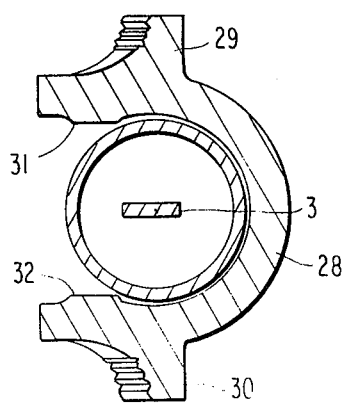
FIG. 3 is a cross sectional view taken along the line III—III in FIG. 1, with the eccentric lever in a closed position.

As shown most clearly in FIGS. 2 and 3, the other end of the lever parts 20, 21 of the eccentric lever are connected by a handle 28 which reaches or extends around the oil gauge pipe 2. In order to provide for an easier manual operation of the eccentric lever 5, the handle 28 may taper off into protruding projections 29, 30.

Holding projections or pins 31, 32 are provided at the lever parts 20, 21 for securing the eccentric lever in a closed position. As shown in FIG. 3, in a closed position of the eccentric lever 5, the holding projections or pins 31, 32 extend around the oil gauge pipe. To secure the eccentric lever 5 in an open position, as shown most clearly in FIG. 1, stopping or holding pins or projections 33, 34 provided at the wall sections 14, 15. The stopping or holding pins or projections 33, 34 are adapted to rest against stopping projections 35, 36 provided at the lever sections 20, 21.

The oil gauge pipe 2 at the opening or inlet end 13, as shown most clearly in FIG. 1, expands to an annular flange portion 12, with a side of the flange 12 facing an inside of the pipe serving as a pipe-side axial contact surface for the sealing ring 10. An outside wall generally designated by the reference numeral 37 of the flange 12 serves as a support surface for eccentrics 24, 25 of the eccentric lever 5. The bearing lugs or eyes 16, 17 for the eccentric lever 5, when the locking cap 4 is in place, are located at about 60% of a diameter of the oil gauge pipe 2 below the wall 37.

When the eccentric lever is moved into the open position shown in full lines in FIG. 1, the eccentrics 24, 25 are turned. The eccentrics 24, 25 turn from the clamped position below the wall 37 shown in phantom line in FIG. 1 into a stopping or locking position, wherein the stopping projections 35, 36 of the lever parts 20, 21 are stopped by engagement with the stopping or holding pins 33, 34 disposed in the wall sections 14, 15. In this situation, the sealing ring 10 is relaxed and the locking cap 4 with the gauge rod 3 may be removed from the oil gauge pipe 2.

After a subsequent re-introduction of the gauge rod 3 into the oil gauge pipe 2 and a resting of the locking cap 4 or sealing ring 10 on an inside wall of the flange 12, the eccentric lever 5 may be turned by about 90° into a closed position (FIGS. 1 and 3), wherein the holding pins or projections 31, 32 extend around the oil gauge pipe 2 in order to secure the eccentric lever 5 in the locked end position.

The parts of the locking means 1 may be made of a plastic or synthetic resinous material by, for example, injection molding or injection die casting, in which case the transverse slot 8 is placed in an area of the bearing lugs or eyes 16, 17.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A cap for an oil gauge pipe, the cap including a measuring rod means adapted to be inserted into the oil gauge pipe, means for mounting the measuring rod means to the cap, means for locking the cap at an opening of the oil gauge pipe, characterized in that the locking means includes an eccentric lever means mounted on the cap for engaging an underside of a flange provided at the opening of the oil gauge pipe when the locking means is in a locked position, a sealing means is mounted on the cap and is interposed between the cap and the flange in such a manner that the cap rests against the flange with the sealing means pressed between an inner surface of the cap and the flange in the locked position of the locking means, the eccentric lever means includes a pair of spaced lever parts disposed parallel to each other, the spaced lever parts are adapted to extend around the oil gauge pipe, and in that means are provided for connecting the lever parts to each other so as to form an operating handle.

2. A cap according to claim 1, characterized in that the cap includes a central projection adapted to be inserted into the gauge pipe, and in that means are provided in the central projection for mounting the measuring rod means so as to be rotatable relative to the cap.

3. A cap according to claim 1, characterized in that the cap has a substantially rectangular outer configuration and includes a first pair of oppositely disposed walls, the eccentric lever means is provided with supporting means for enabling mounting of the eccentric lever means on the cap, and in that means are provided in the first pair of walls for accommodating said supporting means.

4. A cap according to claim 1, characterized in that the operating handle is formed so that, in the locking position of the locking means, at least a portion of the handle surrounds the oil gauge pipe.

5. A cap according to claim 4, characterized in that means are provided on the eccentric lever means for holding the lever means in the locked position.

6. A cap according to claim 5, characterized in that the holding means are holding pins provided on the spaced lever parts in an area of the operating handle.

7. A cap according to claim 5, characterized in that means are provided at the lever parts for facilitating an operation of the eccentric lever means.

8. A cap according to claim 7, characterized in that the facilitating means are protruding projections provided in an area of the operating handle.

9. A cap according to one of claims 1, 4, 5, 6, 7, or 8, characterized in that means are provided on the cap and lever parts for defining an open position of the eccentric lever means.

10. A cap according to claim 9, characterized in that said means for defining the open position includes projections provided at free ends of the lever parts and stopping pin means cooperable with the projections when the eccentric lever means is moved to an open position.

11. A cap according to claim 10, characterized in that the cap is a substantially rectangular outer configuration and includes a first pair of oppositely disposed walls, each of the lever parts is provided with supporting means for enabling a mounting of the lever parts on the cap, and in that means are provided in the first pair of walls for accommodating said supporting means, said stopping pin means are disposed on said first pair of walls.

12. A cap according to claim 11, characterized in that a second pair of oppositely disposed walls are provided for connecting said first pair of walls to each other, one of said second pair of walls forms a stop means for defining an open position of the eccentric lever means.

13. A cap according to claim 12, characterized in that all components of the locking means are made of a plastic material.

14. A cap according to claim 13, characterized in that the cap includes a central projection adapted to be inserted in the gauge pipe, and in that means are provided in the central projection for mounting the measuring rod means so as to be rotatable relative to the cap.

15. A cap according to claim 14, characterized in that the means for accommodating the supporting means includes a pair of bearing openings, and in that said means for mounting the measuring gauge rod means includes a mounting pin and a transverse slot means provided in the central projection for accommodating the mounting pin.

16. A cap according to claim 15, characterized in that surfaces of each of the lever parts adjacent the oil gauge pipe are provided with recesses having a configuration corresponding to an outer configuration of the oil gauge pipe such that the oil gauge pipe is accommodated in the recesses when the eccentric lever means is in an open position.

17. A cap according to claim 1, characterized in that means are provided on the eccentric lever means for facilitating operation of the eccentric lever means.

18. A cap according to claim 1, characterized in that the eccentric lever means includes surface portions disposed adjacent the oil gauge pipe, said surface portions are provided with recesses having a configuration corresponding to an outer configuration of the oil gauge pipe such that the oil gauge pipe is accommodated in the recesses when the eccentric lever means is in an open position.

19. A cap for an oil gauge pipe, the cap including a measuring rod means adapted to be inserted in the oil gauge pipe, means for mounting the measuring rod means to the cap, means for locking the cap at an opening of the oil gauge pipe, characterized in that the locking means includes an eccentric lever means mounted on the cap for engaging an underside of a flange provided at the opening of the oil gauge pipe when the locking means is in a locked position, the cap includes a central projection adapted to be inserted into the gauge pipe, and in that means are provided in the central projection for mounting the measuring rod means so as to be rotatable relative to the cap.

20. A cap according to one of claims 3 or 19, characterized in that said means for mounting the measuring gauge rod means includes a mounting pin and a transverse slot means provided in the central projection for accommodating the mounting pin.

21. A cap for an oil gauge pipe, the cap including a measuring rod means adapted to be inserted in the oil gauge pipe, means for mounting the measuring rod means to the cap, means for locking the cap at an opening of the oil gauge pipe, characterized in that the locking means includes an eccentric lever means mounted on the cap for engaging an underside of a flange provided at the opening of the oil gauge pipe when the locking means is in a locked position, the eccentric lever means includes surface portions disposed adjacent the oil gauge pipe, said surface portions are provided with recesses having a configuration corresponding to an outer configuration of the oil gauge pipe such that the oil gauge pipe is accommodated in the recesses when the eccentric lever means is in an open position.

22. A cap according to one of claims 19 or 21, characterized in that the sealing means is mounted on the cap and is interposed between the cap and the flange in such a manner that the cap rests against the flange with the sealing means pressed between an inner surface of the cap and the flange in the locked position of the locking means.

* * * * *